Aug. 11, 1925.

H. R. SHIFFER

BAKING PAN

Filed May 21, 1923

Inventor
Harry R. Shiffer

Witness

By Richard B. Owen,

Attorney

Aug. 11, 1925.
H. R. SHIFFER
BAKING PAN
1,548,912
Filed May 21, 1923     2 Sheets-Sheet 2
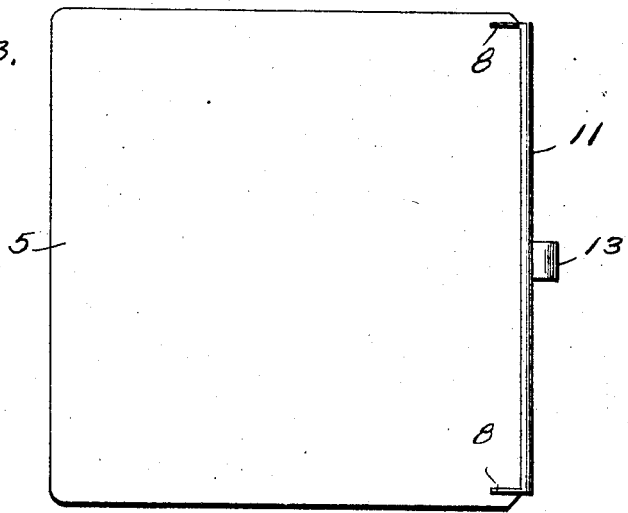
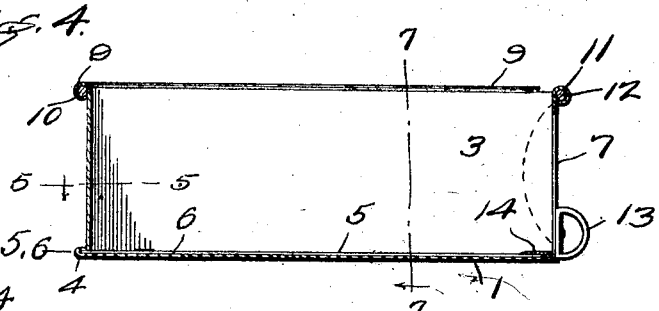
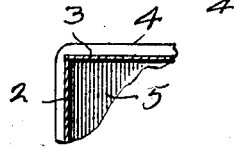
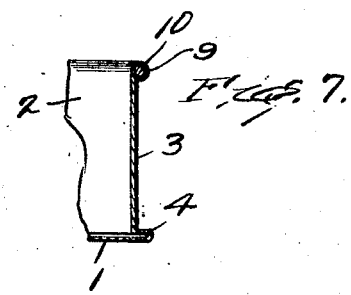
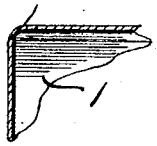
Inventor
Harry R. Shiffer
By Richard B. Owen,
Attorney
Witness Patented Aug. 11, 1925.

1,548,912

UNITED STATES PATENT OFFICE.

HARRY R. SHIFFER, OF BROWNSTOWN, PENNSYLVANIA.

BAKING PAN.

Application filed May 21, 1923. Serial No. 640,579.

*To all whom it may concern:*

Be it known that I, HARRY R. SHIFFER, a citizen of the United States, residing at Brownstown, in the county of Lancaster and State of Pennsylvania, have invented certain new and useful Improvements in a Baking Pan, of which the following is a specification.

The present invention relates to a baking pan for cakes and the like and has for its principal object to provide a structure of this nature from which the cake or like article may be removed very easily without crumbling the cake or otherwise injuring the same.

Another important object of the invention is to generally improve upon baking pans of this nature by providing a simple and efficient structure, one which is reliable, durable, inexpensive to manufacture, and otherwise well adapted to the purpose for which it is designed.

With the above and numerous other objects in view as will appear as the description progresses, the invention resides in certain novel features of construction, and in the combination and arrangement of parts as will be hereinafter more fully described and claimed.

For the purpose of illustrating my invention, I have shown in the accompanying drawing that form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

In the drawing—

Figure 3 is a top plan view of the bottom of the device,

Figure 4 is a section taken substantially on the line 4—4 of Figure 2, and

Figure 1:
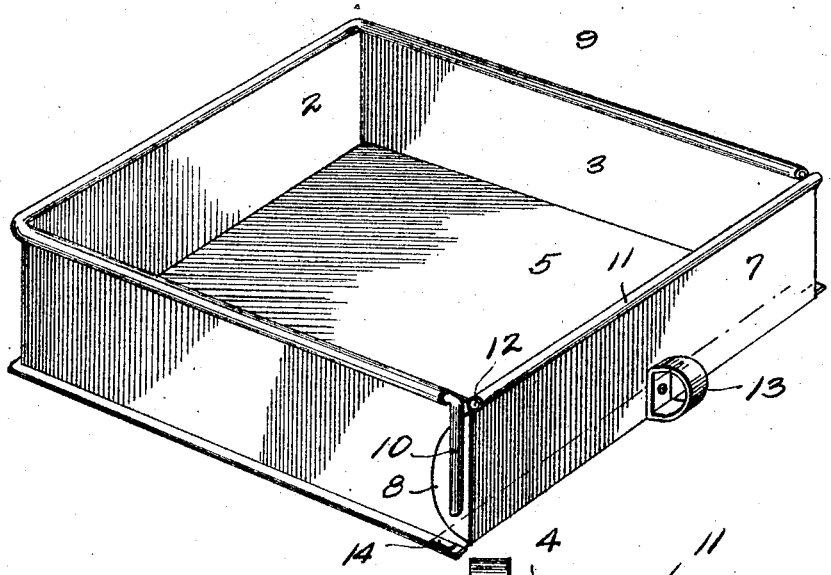
Figure 1 is a perspective view of the device.
Figure 2:
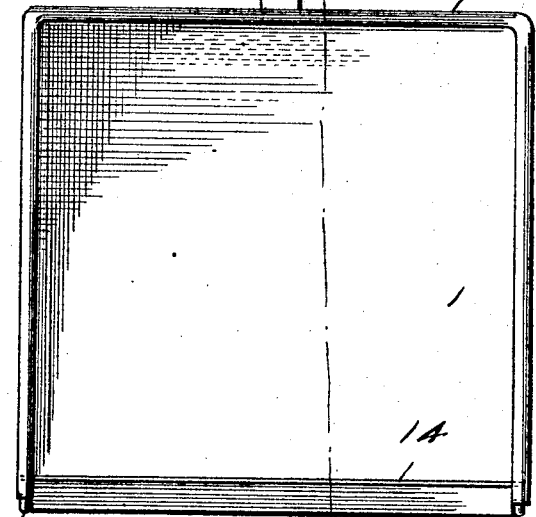
Figure 2 is a top plan view thereof.

Figures 5, 6 and 7 are detail sections taken substantially on the lines 5—5, 6—6, and 7—7 respectively of Figure 4.

Referring to the drawing in detail it will be seen that the pan is formed with a bottom 1 having three upstanding walls. The rear wall is designated by the numeral 2 and the side walls by the numeral 3. A channel bead 4 is formed at the juncture of the bottom 1 with the walls 2 and 3 and forms a slide for a removable bottom or pan 5. This pan 5 slides over the bottom 1 the edges thereof sliding in the bead 4. A wall 7 is formed on one end of the pan 5 and when this pan is disposed over the bottom 1 this wall is disposed opposite the back wall 2 and between the free ends of the side walls 3. The wall 7 is provided with side wings 8 adapted to be disposed alongside of the side walls 3 when the device is assembled. At the upper edges of the walls 2 and 3 there is provided a cylindrical bead 9 and a strengthening wire 10 is disposed therein the ends of which are projected downwardly alongside of the free ends of the side walls 3 and when the device is assembled over the wings 8. A bead 11 is provided on the upper edge of the wall 7 and contains a stiffening wire 12. A handle 13 is provided on the outer face of the wall 7 so that the pan 5 may be moved in and out of the receptacle formed by bottom 1 and the walls 2 and 3. A blade 14 is disposed between the walls 3 a slight distance above the bottom 1, said distance being approximately equal to the thickness of the pan 5. The cutting edge of the blade 14 extends toward the rear wall 2. When the device is assembled and a cake has been baked therein it is only necessary to withdraw the pan 5 and the blade 14 will efficiently sever the cake from said pan so that as it is removed from the receptacle the bottom 1 will prevent any crust from the cake or the like from falling on the floor or table as the pan is being withdrawn.

Having thus described my invention what I claim as new is:—

A receptacle of the class described including a bottom, three side walls upstanding from the bottom, a pan slidable over the bottom, a wall on one end of the pan for association with the other walls, a blade mounted between two of the walls and adapted to scrape over the upper surface of said pan so as to sever a cake or the like therefrom, a reenforced bead on the upper edges of the walls, the reenforcement of said bead depending downwardly at its ends, and wings formed on the side wall mounted on the pan adapted to project between two of the walls and said depending portion of the reenforcement.

In testimony whereof I affix my signature in presence of two witnesses.

HARRY R. SHIFFER.

Witnesses:
  WILLIS E. PIERCE,
  R. M. SHIFFER.